United States Patent Office 3,084,468
Patented Apr. 9, 1963

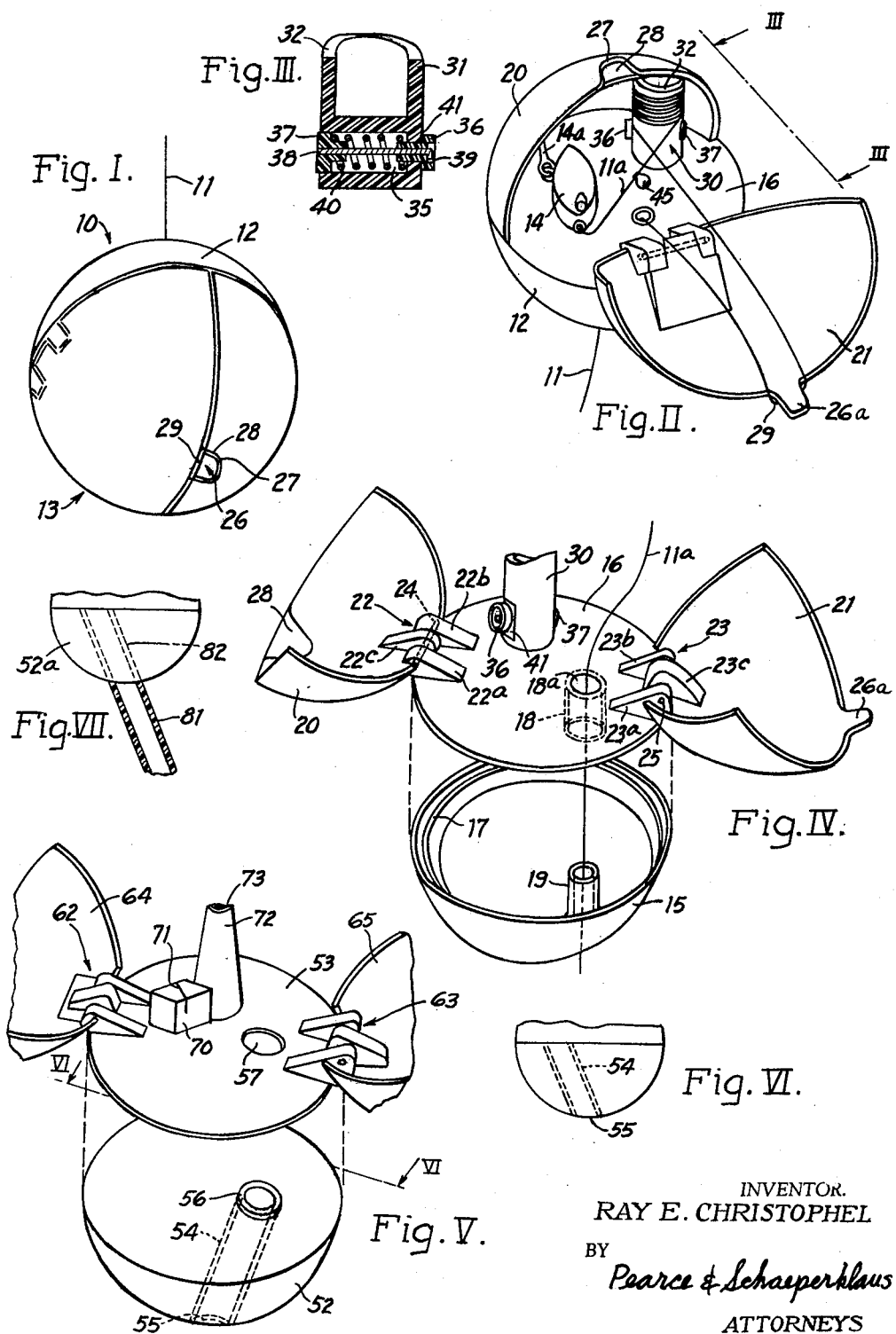

3,084,468
FISHING DEVICE
Ray E. Christophel, Cincinnati, Ohio
(3909 Hammond Blvd., Hamilton, Ohio)
Filed Aug. 1, 1960, Ser. No. 46,708
9 Claims. (Cl. 43—43.11)

This invention relates to a floating fishing device to be used in casting a line for fishing into the water, in which a length of the line and the bait or lure at the end of the length of line is contained within the device until it impacts with or strikes the water after the cast.

It is an object of this invention to provide for a device in which the bait or lure on the end of a fishing line does not become disengaged or separated therefrom during the actual operation of casting the line over, onto, and into the water.

Another object of this invention is to provide for a floating device by which the length of fish line extending into the water from the floating device after the cast is controlled or regulated, thereby predetermining the depth of the water at which the bait or lure may be held.

Another object of this invention is to provide for a fishing device by which casting thereof into shrubbery or reeds or about tree stumps, may be achieved without the hooks or bait at the end of the fish line catching on such shrubs, reeds, stumps or overhanging limbs, along the stream or water beds during the casting operation.

Another object of this invention is to provide for a floating fishing device in which the release of a predetermined length of fish line from the device may be effected thereby providing for reversible reeling of the line through the device after a fish has been hooked and during play of the line with the fish.

A further object of this invention is to make provision for the orderly disposition or arrangement of a length of line with lure or bait attached thereto in the fishing device during the casting operation whereby, upon release from the device, the full length of the length of line and lure thereon is freely discharged into the water without the possibility of snarling or tangling of the line and lure released from said device.

Another object of this invention is to provide a fishing device that is inexpensive to manufacture, is of simple and durable construction, is easy to use, and simple in operation.

These and other objects of the invention will be apparent and will in part be obvious to a person having ordinary skill in the art to which the subject matter pertains, and further will be obvious by a reading of the following description and the appended claims thereto, taken in connection with the accompanying drawing, in which:

FIG. I is a perspective view of the fishing device preparatory to casting;

FIG. II is a perspective view of the device in a partially open position, showing elements of the device in relation to a length of fish line adapted to the device prior to casting;

FIG. III is a cross-sectional elevational view of the depth control or regulating means and the arranging means for the length of line in the device shown in FIG. II;

FIG. IV is a perspective view of a partially unassembled construction of the device;

FIG. V is a perspective view of a partially unassembled construction of a modified form of the device;

FIG. VI is a view taken along line VI—VI of FIG. V; and

FIG. VII is a view similar to the view shown in FIG. VI, and which is a modification thereof.

Referring to the drawing and the figures in detail, 10 represents the fishing device tautly engaging the fish line 11 at the end of a fishing pole (not shown) incident to casting the line over and across a fishing surface. The device 10 comprises means 12 adapted to float the device, which means is preferably a semi-spherically shaped float made of suitable material, such as plastic or cork, and a durable plastic housing 13 adapted to be physically associated with float 12, which housing receives and confines or contains a predetermined length of fish line 11a and lure 14 and hook 14a attached thereto, all as substantially illustrated in FIGS. I and II.

It will be understood that where the terms bait and/or lure are used in the specification, they are used interchangably one for the other, that the meaning of such terms includes all the variations that are ordinarily used in fishing, which include but are not limited thereto, artificial bait, soft bait, meat, insects (artificial or otherwise), hooks, bugs, flies, fish, and the fish line itself, if so desired.

As seen in FIG. IV, float 12 preferably is formed or molded from plastic material, and comprises a semi-spherical shell or frame 15 to which is cemented the base 16 of the housing 13 along a shoulder 17 which is provided along the interior peripheral wall of casing 15 as a molded part thereof. A hollow tube 18 extends vertically below and from base 16 to engage a vertically upwardly extending hollow tube 19 mounted with and upon casing 15 as shown. The end of tube 19 is slipped into the end of tube 18 whereby a snug fit is achieved between the tubes and an open passageway or bore from the exterior of the device to the interior of the device at 18a, is formed in the assembly of base to casing. Plastic cement or other suitable means, such as a gasket, may be applied to the tubes, at the points of fixture each to the other. The assembly of base to casing thus produces an air-tight unified floating member 12.

Housing 13 is preferably made of light weight though substantially strong and durable plastic material, and comprises the base 16 and quarter-shell spherically formed members 20 and 21. Each of the quarter-shell members 20 and 21 is adapted to pivotally swing about base 16 by means of hinges 22 and 23, respectively. Opposing hinges 22 and 23 are mounted along the periphery of base 16, and each comprises a pair of upstanding spaced lugs 22a, 22b, and 23a, 23b, respectively, each pair being mounted on the face of base 16, and lugs 22c and 23c, respectively, each projecting from the interior surface of quarter-shell members 20 and 21, respectively, as shown in FIG. IV. Lug 22c registers between each of lugs 22a, 22b, while lug 23c registers similarly between each of lugs 23a, 23b. Pins 24 and 25, respectively, hinge quarter-shell members 20 and 21 to base 16 by means of joining the aforedescribed respective lugs of hinges 22 and 23 to each other. Thus, in assembled relationship, shell members 20 and 21 of housing 13, pivot freely from closed position as seen in FIG. I, to open position, as seen in FIG. IV.

Latch means 26 is formed on members 20 and 21 of the housing. A tongue 26a formed in member 21 is adapted to register with a channel or recess 27 formed along the central portion of the closing edge of member 20 corresponding to the same portion of the closing edge of member 21 on which tongue 26a is located. Tongue 26a moves into recess 27 upon closing of the members of the housing. A backing 28, which may be molded as part of member 20, is provided across recess 27 upon which tongue 26a rests and is held during the casting operation by means of a loop 29 provided in a portion of fish line 11. Loop 29 is adapted to cooperate with latch means 26 so that housing 13 is maintained in closed position during the casting operation of the device.

Mounted upon base 16 and within housing 13 is arranging means 30, preferably vertically displaced from the base, about which the length of fish line 11a is adapted to be wound or coiled in an orderly manner. As shown in FIG. III, such means comprises a hollow plastic post or sleeve 31 which is offset from the center of base 16 in order to provide maximum loading space for lure 14 or other bait used. Sleeve 31 may be molded as part of base 16, moreover, its end 32 is so spherically curved (FIGS. III and IV) that it fully registers with the spherically curved interior surface of shell members 20 and 21 (FIG. II) when such members are in closed position, whereby the coil formed of the length of line 11a wound upon sleeve 31 remains thereon thereby providing for orderly arrangement and disposition of the length of line in the device during the priming of the device to the fish line preparatory to casting. Means 30 prevents the snarling of length of line 11a as it unwinds after the cast and is discharged into the water.

Means to regulate or control the length of line 11a discharged into the water after the cast is completed is provided within housing 13, and in the instant embodiment of the invention, is incorporated in post 31. The controlling means comprises in essence a piston-like arrangement of parts reciprocating in a bore 35 provided in the lower section of post or sleeve 31, thereby providing for in-and-out movement of a buttonhead 36 against post 31. A finger head 37 extends slightly outwardly of bore 35 and to which a rigid brass wire 38 is fixedly secured. Brass wire 38 extends throughout bore 35 and is wormed through buttonhead 36 to be turned and recessed therein at 39. A spring 40 is provided in bore 35, encircling brass wire 38, and compressed between the inner wall of bore 35 adjacent buttonhead 36 and finger head 37, thereby normally maintaining buttonhead 36 snugly against post 31. Although brass wire 38 is not secured to buttonhead 36 in any way except for its turned end in recess 39, sufficient friction between brass wire 38 and buttonhead 36 carries the latter out from post 31 when finger head 37 is depressed, so that a portion of the length of line 11a may be inserted therebetween. Biased buttonhead 36 is thereby free to rotate about wire 38 advantageously because of line ruts from the inserted fish line otherwise forming in either post 31 or buttonhead 36. As seen in FIG. IV, a flat cut 41 is provided on post 31 behind buttonhead 36 whereby a larger portion of the length of fish line 11a is held between post and head so that a more efficient manner of controlling such length is effected.

The end of fish line 11 is threaded into the formed passageway through float 12 into housing 13 while it is in open position, after which, bait or lure 14 is attached to the end of the line. In an easy mode of operation, after determining the length of line 11a to be discharged into the water, that part of the line at which the length of line 11a begins, is inserted between buttonhead 36 and post 31, and line 11a is thence wound about sleeve 31 and the lure 14 is set upon base 16. Quarter-shell member 20 may then be closed in order to provide means to prevent the coiled length of line upon sleeve 31 from unravelling therefrom during the remainder of the operation of priming the device to the fish line. Since the spherically curved end 32 of sleeve 31 fully registers with the spherically curved interior surface of member 20, this specific construction is very advantageous in the case of a monofilament line being used, the nature of which is springy and difficult to handle when coiled and dry. Loop 29 is thence looped about latch tongue 26a after which line 11 exterior to float 12 is pulled. The tension thus imposed on loop 29 about latch means 26 closes member 21, and effects a lock on the housing in closed position, since the coiled length of line and bait is free of the effect of the taut line 11 upon the loop and the latching means. Sufficient play exists between members 20 and 21 in order that an ample gap or slit appears therebetween and through which loop 29 passes into the interior of housing 13 (FIG. I).

It should be noted that tongue 26a is preferably somewhat elongated in order that loop 29 does not otherwise easily slip off the tongue during the priming of the device. It is also possible to provide for a knotted loop in the line where it is desired in each successive cast, that the same length of line be discharged into the water. The open passageway formed in float 12 by hollow tubes 18 and 19 should thus be of such size that a knotted loop may pass freely therethrough. A sinker 45 of sufficient size not to enter the passageway, may be attached to line 11a adjacent the lure 14, which sinker serves the dual function of aiding the descent of the line into the water as well as preventing damage between the device and lure during the reeling in of the line.

The weight of the device itself is sufficient to tautly engage fish line and loop thereto prior to the act of casting. As the line is cast, device 10 is hurled through the air over and towards the water, tension of line 11 acting upon loop 29 and latch means 26, and thereby preventing housing 13, with the length of fish line and bait therein, from opening. The impact of the water upon the device causes the tension of the fishline to slacken as a whole. Loop 29 slacks upon tongue 26a. Slack, weight of the length of line and lure, as well as the center of gravity of each of members 20 and 21 being substantially near each of their respective hinges, causes such members to pivotally open releasing the bait, sinker and coiled line to the water while float 12 remains at a level degree upon the water. With slack imposed upon loop 29, tongue 26a readily disengages itself from recess 27 as members 20 and 21 pivot about their respective hinges thereby opening the housing. The reaction of line and weight on the regulating means or buttonhead 36 during the discharge of line and bait into the water, has an inconsequential effect upon the cooperative action between post 31, the buttonhead and the portion of the line held thereby.

The catching of the fish hooked on the line effects a release of the line from the clamp between the button head and post (FIG. IV) since the fish itself, pulls or tugs the line free from the regulating means. Thereafter, the construction of the device provides freedom of movement of line relative thereto. The fish line slides freely and easily reversible through the device. Thus, the device remains substantially afloat during the reversible reeling in and out of the line with the play of the fish.

A modified form of construction of the device, in unassembled relationship, is shown in FIGS. V and VI. A cork frame 52 is directly adapted to a bottom member or base 53 of a housing similar to the embodiment of the housing shown in the other figures. Cork 52 and base 53 may be glued or otherwise fixedly fastened to each other. A plastic hollow tube 54 is positioned in floating means 52 in a skewed manner such that its outer end 55 registers with the central point of the spherical surface of cork 52, while its inner end 56 extends above the face of cork 52 at a point offset from the central vertical axis of the housing. End 56 is inserted into an aperture 57 of base 53 such that upon assembly, inner end 56 is flush with the face of base 53 interiorly of the housing. Aperture 57 is located in a line with hinges 62 and 63 substantially as shown in FIG. V. It is obvious that the direction or position of tube 54 may be altered in order to provide a directional passage similar to that exemplified by tubes 18 and 19 in FIGS. II and IV. However, it remains important for ease of operation of the device that the egress point 57 of tube 54 at base 53 be situated substantially in the same vertical plane as that of the tongue or latch means (not shown) formed on shell sides 64 and 65 of the housing, which latch means is similar to the latch means formed on quarter-shell members 20 and 21 in FIGS. II and IV.

Control means for the length of a line to be discharged into the water comprises a small rubber block 70 having a slit 71 extending downwardly from its upper surface substantially midway through its depth, and extending across its width. Means 70 is securely mounted on base 53, e.g., by means of glue, at a point adjacent to a tapering hollow sleeve 72 which functions in the same manner as sleeve 31 does in the other construction. The insertion of a portion of a fish line in slit 71 serves the same regulating function as that disclosed in connection with buttonhead 36. End 73 of sleeve 72 may be spherically formed to register with the interior spherical surface of members 64 and 65. In priming this modified form of the invention for operation, a fish line is threaded through tube 54, a portion of the line at a point which determines the length of line adapted to be discharged into the water is slipped into slit 71 of block 70, the length of the line is wound about sleeve 72, and a loop is formed in the line above that portion of the line in slit 71. The remainder of the use and operation of this modified construction is the same as that described heretofore.

FIG. VII discloses the use of a stem extension 81 to a tube 82 in a floating member 52a. Stem extension 81 may be formed with tube 82, or in the case of its use on a plastic device, it may be molded as one piece with a frame and tube such as exemplified by frame 15 and tube 19 in FIG. IV.

It will be observed that the relative positions of arranging means 30, buttonhead 36, and ingress point 18a of the plastic unit in FIG. IV, and sleeve 72, block 70, and aperture 57 of the cork unit, are located in substantially the same positions with respect to each other and the other elements of their respective embodiments. Finger head 37 is more easily depressed when it faces the open edges of base 16, as distinguished from facing one or the other of hinges 22 or 23. Insertion of a line between buttonhead 36 and post 31 is thereby easily achieved before winding the line about sleeve 31. Similarly, as shown in FIG. V, slit 71 is so cut in block 70 that the same facile step of insertion is met before winding the line about sleeve 72. In regard to ingress point 18a and aperture 57 in each of their respective devices, each is preferably located substantially in the same vertical plane as that of the latching means in their respective units, thereby providing for ease of cooperation of the loops and tongues in their respective devices. In the instant embodiments, the referred-to vertical plane also passes substantially through the centers of the hinges in each of the devices.

While the invention has been described and illustrated by the embodiments shown, it is not intended to be strictly limited thereto, and other variations and modifications may be employed within the scope of the following claims.

Therefore, I claim:

1. A spherical floating fishing device so constructed and arranged as to be mounted on a fish line having a loop formed therein and with which loop said device cooperates, comprising a semi-spherical float, a semi-spherical housing secured to said float, said housing comprising a pair of quarter-shell spherical members each hingedly opposed to the other and capable of pivoting between an open position and a closed position forming an interior for said housing, latch means mounted on said members adapted to cooperate with the loop formed in the fish line, said float having a passageway therein directly connecting the exterior of said device to the interior of said housing whereby the line having a loop formed therein may be threaded therethrough into the housing and the loop made to cooperate with said latch means to maintain said housing in closed position until said device strikes the water.

2. A castable fishing device arranged to be mounted on a fishing line and so constructed as to require a loop formed above a length of the line to cooperate with said device to make it operative, said device comprising a float having a passageway therethrough, a housing being secured to said float and having an interior in which the length of line is retained, said housing having members adapted to pivot between open and closed positions, latch means mounted on said members and adapted to cooperate with the loop in the fishing line in the housing to maintain said housing in closed position, the passageway through said float directly connecting its exterior to the interior of said housing and through which said passageway the length of line and loop thereabove is fed into the interior of said housing to cooperate with said latch means, and means mounted in said housing regulating or controlling the length of line discharged from said housing upon impact of said device with the water over which it is cast, said means releasing the length of line after the hooking of a fish thereby providing for reversible reeling of the line through said device during the resulting play with the hooked fish.

3. A floating fishing device arranged to be mounted on a fish line and so constructed as to require a loop formed in the line to cooperate with said device to make it operative, said device comprising a float having a passageway therethrough, a base on said float, a pair of quarter-spherical shells mounted on said base hingedly opposed to each other and adapted to pivot into registry with each other to form a semi-spherical housing having an interior, the passageway through said float directly connecting the exterior of the device to the interior of the housing, latch means mounted on said shells and adapted to cooperate with the loop formed in the fish line fed through the passageway into said housing to maintain said housing in closed position, a sleeve for winding of the fish line mounted on said base in the interior of the housing and having an end thereof registering with one of said shells to prevent unwinding of the fish line in the housing, and means in said housing to control the length of line discharged into the water upon impact of said device therewith.

4. The device set forth in claim 3 characterized by said last-mentioned means comprising a buttonhead biased against said sleeve and between which a portion of the length of line below said formed loop is clamped.

5. The device set forth in claim 3 characterized by said last-mentioned means therein comprising a block secured to said base, said block having a slit therein in which a portion of the fish line below said formed loop is inserted.

6. In combination, a fish line including predetermined length of fish line and a castable floating fishing device adaptable for said length of fish line, said predetermined length of fish line being discharged from said device upon impact of the device with the water over which it is cast, said device comprising a float, a housing having a base secured to said float, said float having a passageway therethrough and through said base into said housing whereby said length of fish line is threaded therethrough into said housing, said housing comprising a pair of members hingedly opposed to each other and mounted on said base and being adapted to pivot into registry with each other thereby providing for a closed housing in which said length of fish line may be orderly arranged, said fish line forming a loop above said length of fish line, latch means mounted on said members cooperating with said loop whereby tension on the fish line exterior to said device maintains said housing in closed position, a sleeve mounted in said housing, the end of said sleeve fully registering with one of said members when in closed position, said sleeve being adapted to orderly arrange said length of fish line while in the closed housing, and means in said housing adapted to control the length of fish line discharged into the water, whereby upon slack of tension on said loop upon impact of said device with the water, said members pivot open releasing said length of fish line within the housing to the water's depths, said length of line being released from said controlling means after the hooking of a fish thereby providing for reversible reeling of the fish line through said device during the resulting play with the hooked fish.

7. The combination characterized by claim 6 in which the last-mentioned means therein comprises a buttonhead biased against said sleeve clamping therebetween a portion of the length of the line below the formed loop.

8. The combination characterized by claim 6 in which the last-mentioned means therein comprises a block secured to said base and having a slit therein into which a portion of the length of line below the loop is inserted.

9. The combination of a fish line and a device adapted to retain a length of said line until impact of the device with the water over which it is cast, said line having a loop formed therein, said device comprising a float, a housing associated with said float, said float having a passageway formed therein registering with the interior of said housing and through which said length of line has been threaded into said housing, said housing comprising side members adapted to pivot open upon impact of said device with the water, latch means mounted on said side members adapted to cooperate with said formed loop whereby the housing is maintained in closed position, a sleeve in said housing about which said length of line below said formed loop is orderly wound, and control means regulating said length of line discharged into the water after impact of said device with the water, said control means comprising a biased buttonhead and said sleeve clamping therebetween a portion of the length of line below said formed loop.

References Cited in the file of this patent

UNITED STATES PATENTS

| | | |
|---|---|---|
| 2,435,011 | Mason | Jan. 27, 1948 |
| 2,475,736 | Burrous | July 12, 1949 |
| 2,694,878 | Martens | Nov. 23, 1954 |
| 2,914,883 | Kustusch | Dec. 1, 1959 |